United States Patent [19]
Biggs

[11] 3,986,380
[45] Oct. 19, 1976

[54] METHOD FOR REMOVING ELECTRICAL RUNOUT IN MACHINE SHAFTS AND APPARATUS FOR USE WITH THE SAME

[75] Inventor: David H. Biggs, Gardnerville, Nev.

[73] Assignee: Bently Nevada Corporation, Minden, Nev.

[22] Filed: Apr. 28, 1975

[21] Appl. No.: 572,174

[52] U.S. Cl. .................................. 72/76; 72/373; 72/377; 324/34 D
[51] Int. Cl.[2] ........................................ B21J 7/02
[58] Field of Search .............. 72/377, 76, 373, 395, 72/53, 10, 32; 29/407; 324/34 D; 33/178; 408/12; 82/DIG. 8

[56] References Cited
UNITED STATES PATENTS

| | | | |
|---|---|---|---|
| 2,798,387 | 7/1957 | Woodworth | 72/76 |
| 3,566,640 | 3/1971 | Harrington | 72/10 |
| 3,715,659 | 2/1973 | Abnett | 324/34 D |
| 3,750,010 | 7/1973 | Abnett | 324/34 D |

Primary Examiner—C.W. Lanham
Assistant Examiner—Gene P. Crosby
Attorney, Agent, or Firm—Flehr, Hohbach, Test, Albritton & Herbert

[57] ABSTRACT

A method for removing electrical runout in a machine shaft is disclosed. Electrical runout relates to electrical irregularities which can result from non-uniform electrical properties of the materials of the observed surface. A non-contacting eddy current proximity transducer is to be utilized and in which such a non-contacting eddy current proximity transducer is positioned to sense the portion of the shaft from which electrical runout is to be removed. The output of the transducer is sensed to provide an indication of the electrical runout to ascertain where the electrical runout is high and low as the shaft is rotated. The portions of surface of the shaft where the electrical runout is high is cold worked to change the resistivity and permeability of the observed material and bring electrical properties of the worked area in line with adjacent areas to cancel or to remove the electrical runout. In the apparatus, means is provided which performs a peening operation on the shaft to cold work the same.

10 Claims, 5 Drawing Figures

METHOD FOR REMOVING ELECTRICAL RUNOUT IN MACHINE SHAFTS AND APPARATUS FOR USE WITH THE SAME

BACKGROUND OF THE INVENTION

Non-contacting eddy current proximity transducers or proximity measuring systems have been very successfully used for the measurement, monitoring, and analysis of shaft vibration (peak-to-peak displacement amplitude) in rotating machinery. Such read-outs, however, whether by oscilloscope, meter, or x-y recorder, may not provide an absolute indication of the shaft motion relative to the proximity probe or transducer which is normally carried by a mount. Some level of inaccuracy is always present, usually attibutable to a combination of instrumentation error, mechanical runout or shaft damage, and electrical runout, often called glitch, at the measurement location. Mechanical runout and shaft surface damage can normally be held to relatively negligible levels by proper quality control and handling practices. Therefore, it is not a significant source of error. The phenomenon of electrical runout, however, has been found to be much more difficult to remove or to reduce to a minimal value. It is believed that electrical runout can be attributed to material anomalies, variation in material permeability, variation in material resistivity, plated surfaces and other possible unidentified causes. It has been found that even after strong demagnetization it is possible to have a significant level of electrical runout. Runout is normally periodic in nature and may have a once-per-revolution content. The proximity of vibration measurement interprets this runout as shaft motion and vectorially adds the total runout (both electrical and mechanical) to the true shaft motion. In the extreme, the peak-to-peak shaft displacement, as measured at slow roll, may be completely added to or subtracted from the actual dynamic motion of the shaft at operating speed as observed by the proximity system. Under these conditions, runout may be viewed as a plus or minus inaccuracy of the detection system. Because of the problems created by electrical runout, there is a need for a method for removing or cancelling this electrical runout and an apparatus for use with the method.

SUMMARY OF THE INVENTION AND OBJECTS

The method for removing electrical runout in a machine shaft with which there is used a non-contacting eddy current proximity transducer consists of placing a non-contacting eddy current proximity transducer in close proximity to the shaft to sense the portion of the shaft from which electrical runout is to be removed or cancelled. The output of the transducer is sensed to provide an indication of the electrical runout to ascertain where the electrical runout is high and low as the shaft is rotated. The portion of the surface of the shaft where the electrical runout is high is cold-worked to remove the electrical runout. The surface is then re-examined to ascertain whether the electrical runout has been reduced sufficiently and in that portion of the shaft the surface is cold-worked and re-examined until the electrical runout has been reduced to the desired minimum.

In the apparatus for use with the method, a non-contacting eddy current proximity transducer is utilized and is mounted to sense the portion of the shaft in which electrical runout is to be removed. Means is connected to the transducer for sensing the output of the transducer and to provide an indication of the electrical runout from the surface to ascertain where the electrical runout is high and where it is low. Means is provided for cold-working the portion of the surface of the shaft where the electrical runout is high to reduce the electrical runout. Means is provided for sensing the rotation of the shaft so as to make it possible to ascertain when the shaft has been rotated through one complete revolution.

In general, it is an object of the present invention to provide a method for removing electrical runout in machine shafts and to provide an apparatus for use with the same.

Another object of the present invention is to provide a method and apparatus of the above character which can be utilized on machines which are already installed.

Another object of the present invention is to provide a method and apparatus of the above character which is relatively simple and inexpensive.

Another object of the present invention is to provide a method of the above character which can be readily learned.

Another object of the invention is to provide a method in which different types of work-hardening can be utilized.

Additional objects and features of the invention will appear from the following description in which the preferred embodiments are set forth in detail in connection with the accompanying drawing.

DESCRIPTION OF THE PREFERRED EMBODIMENT

In connection with the present invention, it should be appreciated that electrical runout is also called glitch and is a characteristic of a rotating machine shaft being observed by a non-contacting eddy current proximity transducer whose output changes without a physical change in the transducer or probe-to-shaft gap. This change is exclusive of any thermal drift in the machine and applies to the use of such transducers to provide vibration measurements on rotating shafts.

Figure 1:
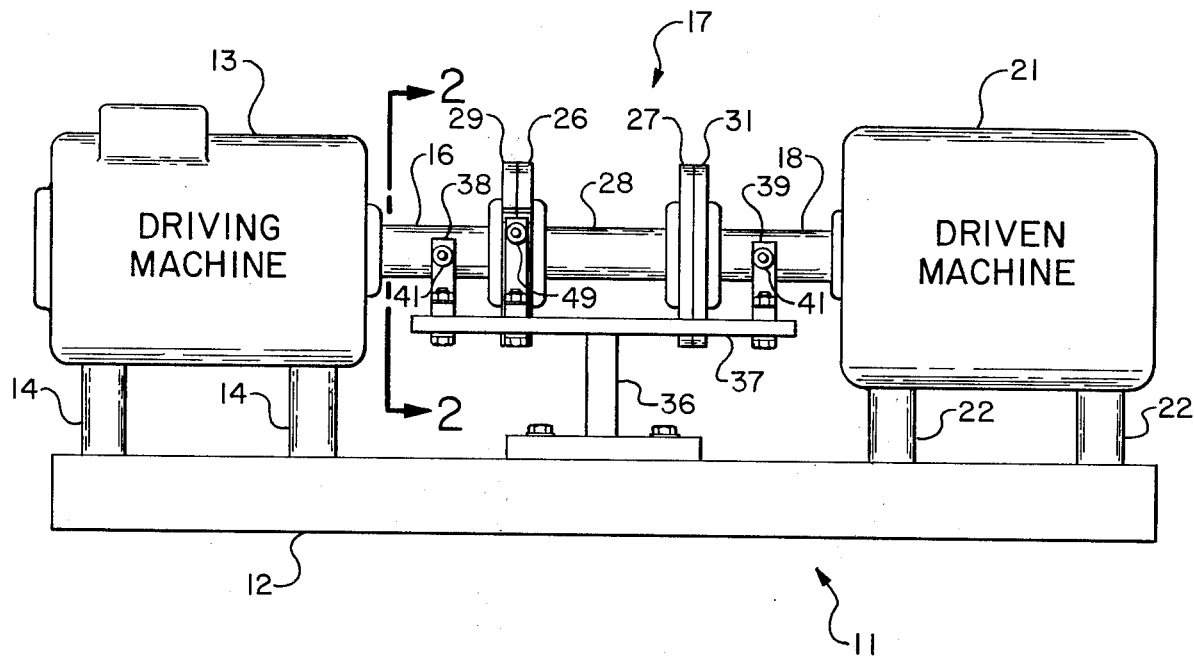
FIG. 1 is a front elevational view of a machine train on which the present invention can be utilized.

Let it be assumed that the method is to be utilized in conjunction with a rotatable machine shaft forming a part of a machine train 11 of a typical type. For example, as shown in FIG. 1, such a machine train 11 can consist of a main base 12 upon which there is mounted a driving machine 13 of a suitable type such as an electric motor which is mounted upon supports 14 secured to the platform 12 so that it is in a fixed position with respect to the platform. The driving machine is provided with an output shaft 16 which is connected by a flexible coupling 17 to a shaft 18 of a driven machine 21 of a suitable type such as a generator, compressor or the like. The driven machine 21 is provided with supports 22 which are mounted on the platform 12 in such a manner (not shown) and in such a position that the position of the machine 21 can be adjusted with respect to the platform 12. Thus, the driving machine 13 is considered to be the fixed machine and the driven machine 21 is considered to be the movable machine. However, it is readily apparent that, if desired, the driven machine can be made the fixed machine and the driving machine 13 may be made the movable machine.

The flexible coupling 17 is of a conventional type and is provided with flanges 26 and 27 with a torsion tube 28 therebetween. The flanges 26 and 27 are secured by bolts (not shown) to a flange 29 provided on the shaft 16 and a flange 31 provided on the shaft 18.

Figure 2:
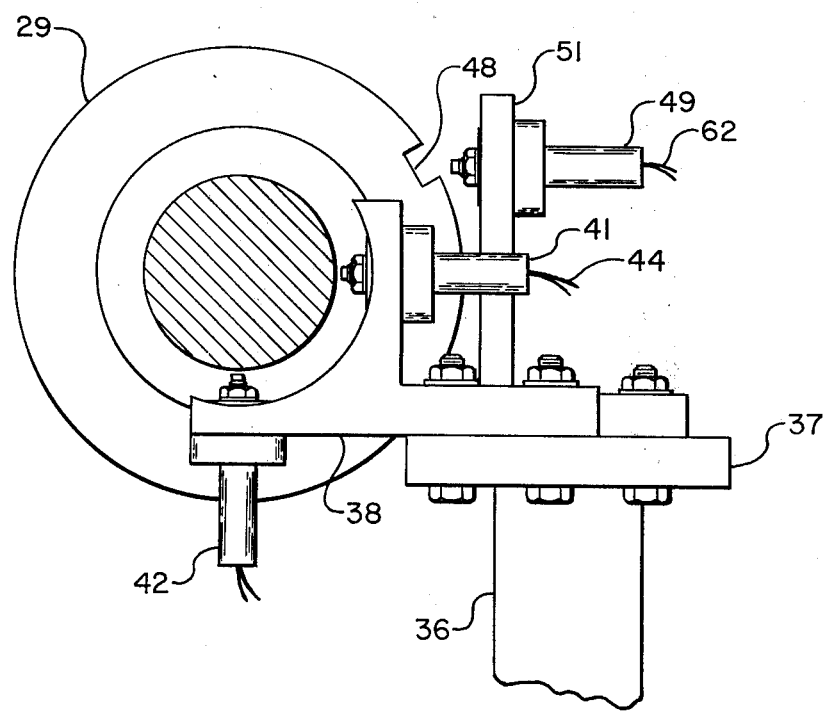
FIG. 2 is a cross-sectional view taken along the line 2—2 of FIG. 1.
Figure 3:
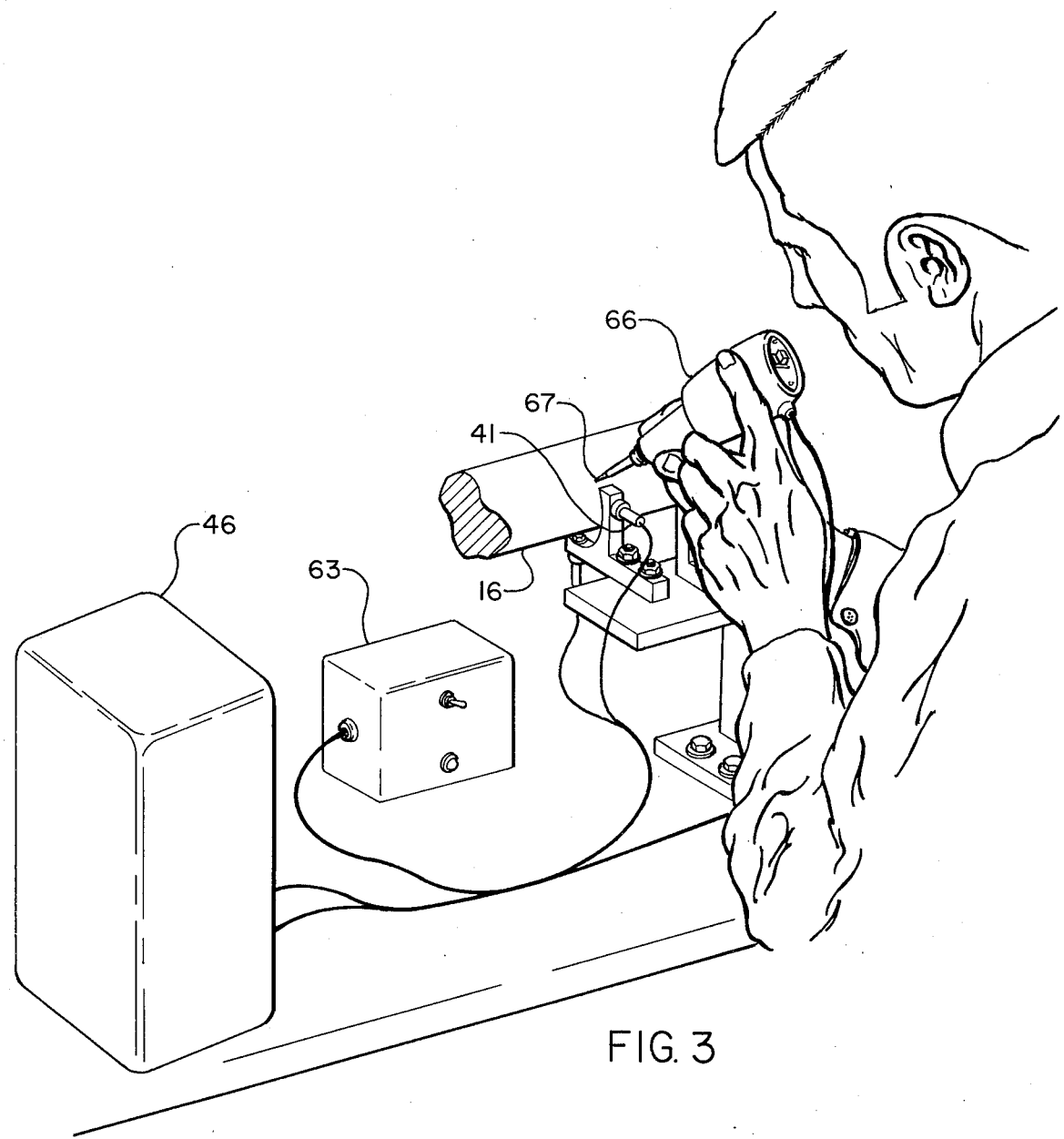
FIG. 3 is a perspective view showing the manner in which the present invention is practiced.

The proximity measuring system which is utilized with the machine train 11 includes at least one probe for measuring and monitoring or analyzing shaft vibration in the machine train. Thus, there is shown in FIGS. 1 and 2 a post 36 which is mounted upon the platform 12. A plate 37 is mounted in a generally horizontal position on the post 36 and is disposed adjacent the shafts 16 and 18. Brackets 38 and 39 are mounted upon the plate. Proximity probes 41 and 42 are mounted on each of the brackets 38 and 39 and are positioned so that their axes pass through the center of the shaft 16 with the probe 41 being positioned for the x coordinate and the probe 42 being positioned for the y coordinate. The probes 41 and 42 are spaced at a suitable distance from the shaft as, for example, between 30 and 80 mils. The proximity probes are of a suitable type such as those manufactured by Bently Nevada Corporation of Minden, Nev.

As shown, the proximity probes 41 and 42 have been mounted adjacent the inboard bearings (not shown) of the driving machine 13 and the driven machine 21. In many applications it may be desirable to utilize proximity probes in connection with the outboard ends of the shafts for the driving machine and the driven machine as well as the inboard ends.

In order to describe the present method for cancelling electrical runout, let it be assumed that in operation of the proximity measuring system that it is found that there is an undesirable amount of electrical runout or glitch in the shaft 16 and that it is desired to remove the same in accordance with the present method. Although the method can be utilized with shafts which have not been installed, the method can also be performed on installed shafts as long as the surface from which the electrical glitch is to be removed is accessible. Let it be assumed that the shaft 16 is formed of a suitable material such as 4041 steel and that is is polished or ground typically of 0.1 of a mil so that there is less than 0.1 mil mechanical runout. Also, let it be assumed that the probes 41 and 42 are positioned so that there is a gap of 50 mils between the surface of the probe and the shaft. The cord 44 from one of the probes as, for example, the probe 41, is connected to suitable electrical runout read-out means such as an oscilloscope 46. Reference means is provided which is used for a purpose hereinafter described which consists of a reference mark in the form of a notch 48 which has been formed in the flange 29. This reference notch is sensed by a phasing probe 49 of a suitable type such as one supplied by the Bently Nevada Corporation of Minden, Nev., which is mounted upon a bracket 51 carried by the plate 37. The output cord 62 of the phasing probe 49 is also connected to the oscilloscope 46 to provide a reference. The probes 41, 42 and 49 are connected to a suitable power supply 63.

Figure 4:
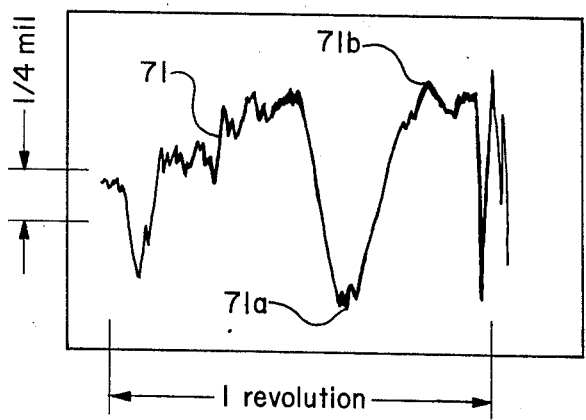
FIG. 4 is a graph showing electrical runout from a machine shaft prior to use of the present invention.

When the necessary connections have been made to the oscilloscope 46 and the power supply 63, the shaft 16 is rotated slowly and the output from the proximity probe is observed on the oscilloscope. In FIG. 4, there is shown a curve 71 which represents the electrical runout from a typical shaft which has not been processed in accordance with the present method. The runout for one revolution is shown. As can be seen, the runout is in excess of 1 mil of electrical runout, whereas as pointed out previously, the shaft should have had less than 0.1 mil of mechanical runout. Therefore, it can be seen that there is a great need to cancel the electrical runout which is shown by the curve 71 which is present in the portion of the shaft which is being observed by the proximity probe 41.

It has been found that this electrical runout can be substantially cancelled by selectively work hardening the portions of the shaft which will be observed by the proximity probes. The work hardening can be accomplished in a number of ways. However, one way found to be particularly satisfactory is by the use of an electrical marker 66 of a conventional type which is provided with a rounded carbide tip 67. The electrical marker with the carbide tip 67 is then utilized for selectively work hardening portions of the surface being observed by the probe 41 to change the electrical properties of the surface of the shaft being observed. The electrical runout pattern may be observed on a voltmeter or an oscilloscope used in the stationary sweep mode to produce a vertical beam movement as the shaft is rotated or an oscilloscope with storage/rewrite capabilities with a camera to record the progress of the cold working or peening which is accomplished by the application of the vibra-pencil or electrical marker 66. When the storage oscilloscope and camera are used, the phasing probe can be utilized to trigger the oscilloscope sweep. In this manner, the shaft display may be started or stopped at the same position each time with the reference points supplied by the phasing probe 49 indicating one complete revolution.

To reduce the electrical runout, the shaft 16 is rotated manually into a position where a peak or less negative voltage appears. Cold working is accomplished by utilizing the vibra-pencil to produce an area of light closely spaced lines on the surface which is observed by the probe. Generally, the lines extend in directions parallel to the axis of the shaft over a suitable width ranging from ⅛ to ½ of an inch. The area which has been cold worked is then re-examined on the oscilloscope or other read-out device to observe the change in the electrical runout. This process is repeated until the desired electrical pattern is obtained. The shaft is then rotated to a new peak to be cold worked and the same process is carried out. Care should be taken to avoid over-working the area which would create a large negative peak. The amplitude of the vibra-pencil or marking pencil should be set to relatively low amplitude and only a small number of lines should be made initially until the effect can be observed on the oscilloscope. Thereafter, after the initial test, the amplitude setting and number of lines may be varied to obtain maximum results. The depth of the surface treatment is limited to approximately 0.05 mils so that the surface deformation does not exceed 0.1 mil. The resultant finish is about 60 microinches and, therefore, should not be used where probes are embedded in the center of bearings.

Figure 5:
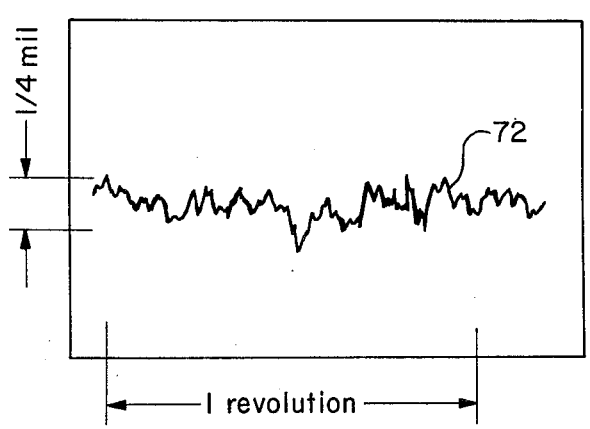
FIG. 5 is a graph showing electrical runout from the same machine shaft after use of the present invention.

The change which can be accomplished in electrical runout is shown in FIG. 5 which is the same shaft as shown in FIG. 4 after the process utilizing the present invention has been performed repeatedly on the shaft until the electrical runout has been reduced to less than ¼ mil as can be seen from FIG. 5. Thus, it can be seen that the electrical runout has been reduced to one-fourth of that which it was previously.

From the graphs shown in FIGS. 4 and 5 it can be seen that the vibra-pencil makes more negative peaks in the electrical runout. Thus, to reduce the electrical runout, the most negative peak is observed as, for example the peak 71a in FIG. 4. Then the most positive peaks are observed as, for example, the peaks 71b in the curve 71. The shaft 16 is rotated until one of the positive peaks 71b is observed and then the vibra-pencil is utilized to work harden that portion of the surface to bring down the positive peak. The other positive peaks 71b are also located in a similar manner and the surfaces are work hardened to bring down the peaks. This operation is continued until the positive peaks have been brought down to a base line which is generally represented by the bottom of the original and most negative peak as, for example, the negative peak 71a. This makes it possible to reduce or substantially cancel out the electrical runout so that it is less than ¼ mil as shown by the curve 72 in FIG. 5.

It is believed that the work hardening of the surface increases the permeability of the surface of the shaft as well as increases the resistance of the surface of the shaft. This one would believe should cause a positive going spike in the oscilloscope curve. However, it has been found that, as pointed out above, when the surface of the shaft is work hardened a negative going spike is produced. It is believed that a negative going spike is produced because of the change in the surface contour and surface continuity of the shaft. These characteristics have no relationship with work hardness and permeability and work hardness and resistivity in normal theoretical aspects. It is believed that the work hardening of the surface makes the surface more electrically conductive or, as far as the probe is concerned, the shaft is less resistive.

In certain types of alloy steels, the net effect of the work hardening can be a decrease in the effective permeability. A typical example of this would be a highly oriented crystallized nickel type steel in which the work hardening disrupted the crystal grains on the surface to decrease permeability. However, this would not be the case in most machine shafts.

It should be appreciated that in connection with the probes hereinbefore described that the eddy currents which are utilized in conjunction with the probes only penetrate approximately 1½ mils into the surface of a 4140 steel. As is well known to those skilled in the art, in the general theory concerning eddy currents approximately 96.4 percent of the activity takes place within three skin depths. In calculating the skin depth for 4041 steel, a typical skin depth will be approximately ½ mil so that three skin depths would be approximately 1.5 mils. Thus, at a depth greater than 1.5 mils, there is substantially no eddy current action taking place. In this connection it should be appreciated that the relationship between skin depth and frequency must be taken into account, as the frequency increases, the skin depth decreases. The foregoing statements were based on an operating frequency of one megacycle per second.

Although the work hardening has been described as only being accomplished by one method, it should be appreciated that the work hardening can be accomplished in other ways. For example, by sand blasting utilizing glass beads, it has been possible to create negative spikes in the electrical runout pattern.

In carrying out the work hardening, the vibra-pencil can be moved back and forth in the same area as, for example, an area of approximately ⅛ inch wide for several times in a direction generally parallel to the axis of the shaft. Other positive peaks can be treated in the same way. As the positive peaks become less in amplitude, it is desirable to decrease the stroke of the marker as well as the number of times it is moved back and forth over the same area so that there is no danger of creating negative spikes which are in fact lower than the original negative spike to which the pattern is brought down to.

It also should be appreciated that in place of the oscilloscope, a digital voltmeter can be utilized. The shaft can be slowly rotated and the high spots can be ascertained according to the digital readout provided. The shaft can then be marked and then turned so that the area which was observed by the probe can be work hardened. This is accomplished until the digital voltmeter shows that the positive peaks have been eliminated.

If there is electrical runout due to magnetism, the magnetism should be removed before work hardening of the shaft is accomplished to remove electrical runout. Magnetism can be removed by demagnetizing the shaft.

It is apparent from the foregoing that there has been provided a method and apparatus for removing electrical runout from a machine shaft. Since the apparatus which is utilized is relatively simple and inexpensive, the apparatus can be utilized in the field with already installed machines or, alternatively, it can be utilized on shafts which are to be installed in equipment and machines. The technique which is utilized in the method is one which can be readily learned within a few hours. The necessary tools and equipment which are required are relatively few in number.

I claim:

1. In a method for removing electrical runout in a machine shaft with which a non-contacting eddy current proximity transducer is to be utilized, placing a proximity transducer to sense the portion of the shaft from which electrical runout is to be removed, sensing thee output of the proximity transducer to provide an indication of electrical runout to ascertain where the electrical runout is high and where it is low when the shaft is rotated, cold working the portion of the shaft where the proximity transducer observes a peak in the electrical runout to reduce the electrical runout.

2. A method as in claim 1 together with repeatedly examining the areas of high electrical runout and continuing to additionally work harden the area until the areas of high electrical runout are generally brought down in close proximity to the areas of lowest electrical runout where the output of the transducer is low.

3. A method as in claim 1 together with the step of providing a reference signal on each revolution of the shaft.

4. A method as in claim 1 wherein work hardening is utilized to produce negative going spikes which are utilized to reduce the amplitude of the positive going peaks in electrical runout.

5. A method as in claim 1 wherein the cold working of the portion of the surface of the shaft is accomplished by a peening operation.

6. A method as in claim 5 wherein the peening operation is carried out in directions generally parallel to the axis of the shaft.

7. A method as in claim 6 wherein the peening operation is carried out through the formation of several rows of indentations in the surface of the shaft.

8. In an apparatus for removing electrical runout in machine shafts with which a non-contacting eddy current proximity transducer is to be utilized, means for sensing the electrical runout from the shaft, means for indicating where the electrical runout is high and low from the shaft, and means for work hardening the surface of the shaft to reduce the electrical runout where it is high.

9. Apparatus as in claim 8 wherein said means for work hardening the shaft includes a rounded tip and means for causing vibratory motion of the rounded tip.

10. Apparatus as in claim 8 together with an oscilloscope means for connecting the sensing means to the oscilloscope and phasing means for ascertaining when the shaft completes a revolution.

* * * * *